United States Patent [19]

Dubois

[11] Patent Number: 5,280,167
[45] Date of Patent: Jan. 18, 1994

[54] VERY HIGH ANGULAR RESOLUTION LASER BEAM RIDER DETECTOR HAVING A GATED IMAGE INTENSIFIER AND A VIDEO CAMERA

[75] Inventor: Jacques Dubois, Neufchâtel, Canada

[73] Assignee: Her Majesty the Queen as represented by the Minister of National Defence of Her Majesty's Canadian Government, Ottawa, Canada

[21] Appl. No.: 4,073

[22] Filed: Jan. 13, 1993

[51] Int. Cl.⁵ ............................................. H01J 40/14
[52] U.S. Cl. .............................. 250/214 VT; 342/54; 342/45
[58] Field of Search ............... 250/214 VT, 206.2; 342/54, 45, 20; 356/141, 152; 359/158

[56] References Cited

U.S. PATENT DOCUMENTS 4,630,049 12/1986 Callahan, Jr. ..................... 342/45
5,142,288 8/1992 Cleveland ......................... 342/45

Primary Examiner—David C. Nelms
Assistant Examiner—Que T. Le
Attorney, Agent, or Firm—Larson and Taylor

[57] ABSTRACT

A laser warning receiver (LWR) having an ability to not only detect a low power level laser source, such as a pulse train emitted by a laser beam rider, but to also provide a high angular resolution in determining the angle of arrival of that pulse train. The receiver includes a lens/filter arrangement for a large area photodetector to detect an incoming signal from an emitting source and a high gain amplifier to amplify the signal which is then applied to a synchronization generator that generates a digital pulse train with pulses corresponding to peaks in the incoming signal. The digital pulse train is applied to a code breaker where the code is analyzed and a further code is generated anticipating the arrival of further pulses in order to verify the code. That further code is applied to a time gate generator which generate a code, synchronized with the incoming signal, that controls the high voltage of a gated image intensifier which is coupled to a video camera. Gating of the image intensifier is synchronized, as a result, with coded emissions from the source so that a video image from the camera can be displayed on a monitor and more easily differentiated from the background. The width of pulses generated by the time gate generator, the video camera, gain of the gated image intensifier, gain of the gated image intensifier and an auto-iris zoom lens coupled to the image intensifier are all under the control of a video processor.

14 Claims, 1 Drawing Sheet

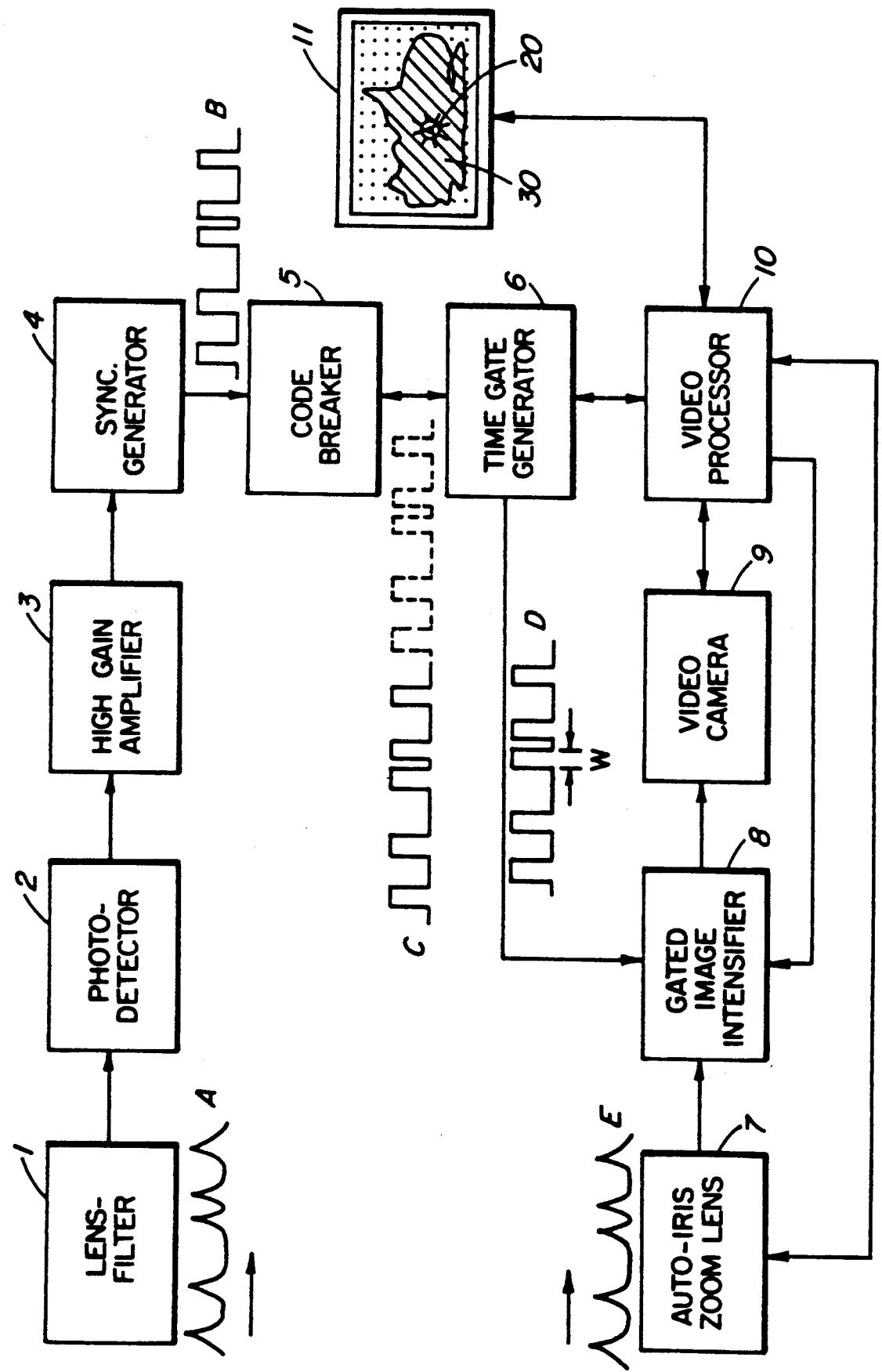

VERY HIGH ANGULAR RESOLUTION LASER BEAM RIDER DETECTOR HAVING A GATED IMAGE INTENSIFIER AND A VIDEO CAMERA

FIELD OF THE INVENTION

The present invention relates to a laser warning receiver (LWR) for protecting military platforms against laser guided weapons by detecting, identifying and locating the laser sources associated with those weapons and in particular to receivers which can detect radiation from low power laser sources, such as those for a laser beam rider (LBR), with a high angular resolution in the determination of the angle of arrival of the laser radiation.

BACKGROUND OF THE INVENTION

Many research laboratories and manufacturers around the world are presently involved in the development of laser warning receivers (LWR) for the purpose of protecting military platforms against laser guided weapons by detecting, identifying and locating the laser sources associated with those weapons. A high angular resolution in the determination of the angle of arrival of the laser radiation from laser guided weapons is essential in order to effectively optimize counter measures deployment against those weapons. This type of resolution is only possible with the receivers available at present for powerful laser sources like laser range finders (LRF) and laser target designators (LTD) which generate relatively high levels of power density. The detection of low level power sources is still characterized by a very low resolution with none of the existing LWR's being capable of detecting radiation from a LBR with an angular resolution better than a quadrant. LBR detection up to now has been usually carried out by dedicated wide field-of-view (FOV) high-gain modules, one per quadrant, which simply detect a LBR source without any resolution.

SUMMARY OF THE INVENTION

It is an object of the present invention to provide a laser warning receiver (LWR) with the ability to not only detect low power level laser sources such as radiation from a LBR, but also to be able to provide a high angular resolution in the determination of the angle of arrival of radiation from that source.

A laser warning receiver according to one embodiment of the present invention comprises a lens/filter arrangement for a large area photodetector to detect an incoming signal consisting of a laser beam pulse train emitted by a source, the output from the detector being connected to a high gain amplifier for amplifying the detected signal, the output from the amplifier being connected to a synchronization generator which generates a digital pulse train with pulses corresponding to peaks in the detected pulse train and applies that digital pulse train to a code breaker to which it is connected, the code breaker analyzing and deciphering the code and generating a further code anticipating the arrival of further pulses from the emitting source in order to verify that code and to generate an anticipated code that is applied to a time gate generator to which it is connected, a code generated by the time gate generator having pulses synchronized with ones in the anticipated code controlling a high voltage of a gated image intensifier so that gating is obtained with the image intensifier sampling being synchronized with coded emissions from the source, a video camera being coupled to the gated image intensifier to obtain an image of the source which can be displayed on a video monitor connected to the camera.

In a further preferred embodiment, the video camera is connected to the video monitor via a video processor, the video processor being connected to the time gate generator and being adapted to control the pulse width of pulses in the code applied to the gated image intensifier.

In a still further embodiment, an auto-iris zoom lens is coupled to the gated image intensifier and connected to the video processor which is adapted to control the auto-iris zoom lens and field-of-view of the image intensifier.

BRIEF DESCRIPTION OF THE DRAWING

The invention will now be described in more detail with reference to the accompanying drawing, in which the single figure is a block diagram of a laser warning receiver (LWR) according to the present invention with a number of waveforms being shown to illustrate the operation of that receiver.

DETAILED DESCRIPTION OF THE DRAWING

The very high resolution LBR detector according to the present invention and illustrated in the figure includes an optical filter 1 which would feature a fixed or variable spectral bandwidth arranged before either a large area photodetector 2 or a smaller photodetector coupled to a very short focal length lens. In one particular embodiment of this LBR detector, four detector units would be provided each with a 90° coverage in azimuth and elevation. A laser pulse train emitted by a LBR source, as illustrated at A, is filtered by optical filter 1 and detected by the photodetector 2 whose output is applied to a high gain amplifier 3.

The high gain amplifier 3 amplifies the received laser pulse train A and applies that amplified signal to a synchronization pulse generator 4 which generates a series of digital synchronization pulses B that corresponds to peaks in pulses from the received signal A. The series of pulses B from synchronization generator 4 are then applied to a code breaker 5 where the code is analyzed and deciphered in order to identify the source of the received signal A and to anticipate the time of arrival of further pulses in order to verify the perfect synchronization of the digital pulse code C with the received signal A. Once verified, the synchronization generator 4 also restores any pulses from the received signal A which are missing or are so weak as to go undetected by photodetector 2.

The verified digital pulse code C is applied to a time gate generator 6 which generates a series of pulses D synchronized with ones emitted by a LBR source and detected by the photodetector 2. However, although pulses D are synchronized with those at B, the pulses in pulse train D have widths W that are continuously variable, those widths being controlled by a video processor 10 which is connected to the time gate generator 6.

The pulse train D, from the time gate generator 6, is applied to a gated image intensifier 8 coupled to a video camera 9, which obtains an image from the gated image intensifier and applies that image to the video processor 10. The pulse train D controls the high voltage of the image intensifier 8 and the intensifier gating so obtained makes possible the synchronization of the image intensifier sampling, which are recorded by video camera 9, with the emissions from the source so that the latter is more strongly differentiated from the background. The widths W of the pulses in pulse train D are continuously variable under control of video processor 10 which can adjust those widths in order to obtain an adequate image of the source with respect to the background. The video processor 10 controls the adjustments of video camera 9 and processes the video image from the camera 9 before applying that processed signal to a video monitor 11 where the laser source can be observed as an image 20 against a background 30.

The video processor 10 is also connected to and controls an auto-iris zoom lens 7 for the gated image intensifier 8 whose focal length is initially in the wide angle position. The lens 7 in this wide angle position, if it is directed towards the source, will receive the same type of signal E from the source as that received by filter 1 and detected by photodetector 2. However, once the lens 7 is directed towards the signal source, its focal length can be increased by the video processor 10 to pinpoint the laser source into a narrow field-of-view (FOV). This will result in a system that will provide a high angular resolution in determining the angle of arrival of the laser radiation emitted from a low power source such as a LBR. Once this high angular resolution is obtained, adequate countermeasures can be deployed in order to counteract any threat from the signal source.

In operation, a laser pulse train A emitted by a LBR source would be first detected by a large area photodetector system through a lens/filter arrangement 1 and then amplified by a high gain amplifier 3 which forms a detector/amplifier unit. In one particular embodiment, four detector/amplifier units would be used with each unit providing a 90° coverage in azimuth and elevation. An amplified signal of a detected laser pulse train A is then applied to a synchronization generator 4 which would generate a digital pulse train B having a code corresponding to and synchronized with that emitted from the LBR source and detected by photodetector 2. That digital pulse train B is applied to a code breaker 5 where the code is analyzed and deciphered so that the time of arrival of the next peaks in the pulse train A can be anticipated. This generated code can then be verified by the perfect synchronization of the anticipated code pulses with those actually received. Once this code is verified, the code C from code breaker 5 is applied to a time gate generator 6 which generates a similar train of pulses D, but ones whose widths can be varied, which are applied to the gated image intensifier 8. The gated image intensifier 8 is provided with an auto-iris zoom lens 7 which initially is in a wide angle position to provide a single wide FOV (>45°) system. This system is rotatable so that it can be brought into a position covering an angular sector where a laser pulse train A from a LBR source is detected by one of the four detector/amplifier units. That rotatable system can then receive a signal E, which is the same as laser pulse train A, from the LBR source.

A video camera 9 will then be able to obtain a video image of the source emitting the laser pulse train A from the gated image intensifier once its auto-iris focus lens is directed to an angular sector containing the emitting source. The video camera supplies the video image signal to a video processor 10 which can process and display the image 20 of the source on a monitor 11. The video processor 10 controls, through its interconnections, the adjustments of the video camera 9 and the gain of the image intensifier 8. The video processor 10 is also connected to time gate generator 6 and controls the width of the pulses in pulse train D from the time gate generator 6. Those variable width pulses, under control of processor 10, are applied to the gated image intensifier 8 to control the high voltage of the image intensifier. The gating of the image intensifier, thus obtained, makes possible the synchronization of the image intensifier sampling, recorded by the video camera, with the peaks of the emitted pulse train from the source so that an image of the source can be more easily differentiated from the background 30 shown on the monitor 11. The width of the gated pulses can be varied by the video processor in order to optimize the, or at least obtain an adequate, image 20 of the source which can be shown on the monitor 11.

The video processor can, by controlling the auto-iris function of the zoom lens 7, increase the focal length of the zoom lens to pinpoint the source into a narrow FOV and to keep the image intensifier directed towards the source once the zoom lens 7, in its initial wide angle position, image intensifier and video camera are directed towards the source. This narrow FOV pinpointing of the source provides a high angular resolution in the determination of the angle of arrival of the laser radiation from an LBR source. At this point, countermeasures can be deployed against the source in order to counteract its navigation system.

The overall dynamic range of this type of system can reach 12 order of magnitude by using controlling elements, automatic intensifier gain adjustment, a zoom lens auto-iris function and continuously variable intensifier gating under control of the video processor. The operation of this type of laser warning receiver will, as a result, be possible from bright sunlight to moonless nights. Either a GEN II (0.4 $\mu$m to 0.9 $\mu$m) or GEN III (0.57 $\mu$m to 0.9 $\mu$m) image intensifier can be used depending on the sensitivity and wavelength required. An angular resolution down to a fraction of a mrad is possible with this type of laser warning receivers.

Various modification may be made to the preferred embodiments without departing from the spirit an scope of the invention as defined in the appended claims.

The embodiments of the invention in which an exclusive property or privilege is claimed are defined as follows:

1. A laser warning receiver comprising a lens/filter arrangement for a large area photodetector system which can detect an incoming signal consisting of a laser pulse train emitted by a source, which detected signal is applied to a high gain amplifier connected to the photodetector system forming a detector/amplifier unit, an output from the amplifier being connected to a synchronization generator which generates a digital pulse train with pulses corresponding to peaks in the laser pulse train and applies that digital pulse train to a code breaker to which it is connected, the code breaker analyzing and deciphering the code and generating a code anticipating the arrival of further pulses from the source in order to verify that code and to generate an anticipated code that is applied to a time gate generator to which the code breaker is connected, the time gate generator being connected to a gated image intensifier, a code generated by the time gate generator having pulses synchronized with ones in the anticipated code controlling a high voltage of the image intensifier so that gating of image intensifier is obtained which is synchronized with coded emissions from the source, a video camera being coupled to the gated image intensifier to obtain an image of the source which can be displayed on a video monitor connected to the camera.

2. A laser warning receiver as defined in claim 1, wherein the video camera is connected to the video monitor via a video processor, the video processor being connected to the time gate generator and being adapted to control widths of pulses of the code generated by the time gate generator which are applied to the gated image generator.

3. A laser warning receiver as defined in claim 2, wherein the video processor is connected to the gated image intensifier and is adapted to control adjustments of the video camera and gain of the gated image intensifier.

4. A laser warning receiver as defined in claim 3, wherein an auto-iris zoom lens is coupled to the gated image intensifier and connected to the video processor which is adapted to control the auto-iris zoom lens and field-of-view of the image intensifier.

5. A laser warning receiver including four detector/amplifier units as defined in claim 4 with each providing a 90° coverage in azimuth and elevation combined with a single gated image intensifier and video camera system which is rotatable in order to bring that system into an angular sector where a laser emission is detected by one of the detector/amplifier units.

6. A laser warning receiver as defined in claim 4, wherein the image intensifier detects radiation in the 0.4 μm to 0.9 μm range.

7. A laser warning receiver as defined in claim 4, wherein the imaged intensifier detects radiation in the 0.57 μm to 0.9 μm range.

8. A laser warning receiver including four detector/amplifier units as defined in claim 1 with each providing a 90° coverage in azimuth and elevation combined with a single gated image intensifier and video camera system which is rotatable in order to bring that system into an angular sector where a laser emission is detected by one of the detector/amplifier units.

9. A laser warning receiver including four detector/amplifier units as defined in claim 2 with each providing a 90° coverage in azimuth and elevation combined with a single gated image intensifier and video camera system which is rotatable in order to bring that system into an angular sector where a laser emission is detected by one of the detector/amplifier units.

10. A laser warning receiver including four detector/amplifier units as defined in claim 3 with each providing a 90° coverage in azimuth and elevation combined with a single gated image intensifier and video camera system which is rotatable in order to bring that system into an angular sector where a laser emission is detected by one of the detector/amplifier units.

11. A laser warning receiver as defined in claim 8, wherein the image intensifier detects radiation in the 0.4 μm to 0.9 μm range.

12. A laser warning receiver as defined in claim 9, wherein the image intensifier detects radiation in the 0.4 μm to 0.9 μm range.

13. A laser warning receiver as defined in claim 10, wherein the image intensifier detects radiation in the 0.4 μm to 0.9 μm range.

14. A laser warning receiver as defined in claim 2, wherein an auto-iris zoom lens is coupled to the gated image intensifier and connected to the video processor which is adapted to control the auto-iris zoom lens and field-of-view of the image intensifier.

* * * * *

UNITED STATES PATENT AND TRADEMARK OFFICE
CERTIFICATE OF CORRECTION

PATENT NO. : 5,280,167
DATED : January 18, 1994
INVENTOR(S) : Dubois

It is certified that error appears in the above-identified patent and that said Letters Patent is hereby corrected as shown below:

Title page: item [30] should be added to read as follows:

[30]    Foreign Application Priority Data

June 18, 1992 [CA]   Canada ............ 2,071,580

Signed and Sealed this

Twenty-third Day of August, 1994

Attest:

BRUCE LEHMAN

Attesting Officer    Commissioner of Patents and Trademarks